(12) United States Patent
Waidman et al.

(10) Patent No.: US 10,165,150 B2
(45) Date of Patent: Dec. 25, 2018

(54) PRINTER WITH TWO SCANNERS

(71) Applicant: HP INDIGO B.V., Amstelveen (NL)

(72) Inventors: Ran Waidman, Rehovot (IL); Sagi Refael, Ness Ziona (IL); Lior Katz, Raanana (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/038,003

(22) PCT Filed: Nov. 22, 2013

(86) PCT No.: PCT/EP2013/074497
§ 371 (c)(1),
(2) Date: May 19, 2016

(87) PCT Pub. No.: WO2015/074715
PCT Pub. Date: May 28, 2015

(65) Prior Publication Data
US 2016/0277629 A1 Sep. 22, 2016

(51) Int. Cl.
*H04N 1/00* (2006.01)
*H04N 1/32* (2006.01)
(Continued)

(52) U.S. Cl.
CPC ..... *H04N 1/32133* (2013.01); *B41F 33/0036* (2013.01); *H04N 1/00005* (2013.01); *H04N 1/0005* (2013.01); *H04N 1/00015* (2013.01); *H04N 1/00031* (2013.01); *H04N 1/00047* (2013.01); *H04N 1/00063* (2013.01); *H04N 1/00068* (2013.01); *H04N 1/00665* (2013.01); *H04N 1/00705* (2013.01);
(Continued)

(58) Field of Classification Search
CPC ........... H04N 1/32133; H04N 1/00665; H04N 1/0476; H04N 1/2038; H04N 1/0473; H04N 1/047
See application file for complete search history.

(56) References Cited

U.S. PATENT DOCUMENTS 4,794,241 A 12/1988 Carsner et al.
6,366,358 B1 4/2002 Satou et al.
(Continued)

FOREIGN PATENT DOCUMENTS

CN 101551342 10/2009
EP 0554811 8/1993
(Continued)

OTHER PUBLICATIONS

International Searching Authority, The International Search Report and the Written Opinion, dated Mar. 21, 2014, 12 Pages.
(Continued)

*Primary Examiner* — Benjamin O Dulaney
(74) *Attorney, Agent, or Firm* — HP Inc. Patent Department

(57) ABSTRACT

A printer (300) is disclosed. The printer has two scanners (336, 338) in the paper path of the printer located after the print zone (346). The two scanners are spaced apart from each other by a known distance A and overlap each other in a direction perpendicular to the media axis of travel. The two scanners capture a first and second image of the media.

18 Claims, 7 Drawing Sheets

(51) Int. Cl.
*B41F 33/00* (2006.01)
*H04N 1/047* (2006.01)
*H04N 1/12* (2006.01)
*H04N 1/04* (2006.01)
*H04N 1/203* (2006.01)

(52) U.S. Cl.
CPC ......... *H04N 1/0464* (2013.01); *H04N 1/0473* (2013.01); *H04N 1/0476* (2013.01); *H04N 1/12* (2013.01); *H04N 1/2038* (2013.01); *H04N 1/00087* (2013.01); *H04N 2201/0081* (2013.01); *H04N 2201/0082* (2013.01); *H04N 2201/04713* (2013.01); *H04N 2201/04717* (2013.01)

(56) References Cited

U.S. PATENT DOCUMENTS

| | | | |
|---|---|---|---|
| 6,853,816 | B2 | 2/2005 | Miyata |
| 7,665,817 | B2 | 2/2010 | Folkins |
| 2003/0048313 | A1* | 3/2003 | Frodl .................. G03G 15/00 346/44 |
| 2006/0086275 | A1* | 4/2006 | Fernandez ............. B41J 11/46 101/485 |
| 2006/0232702 | A1 | 10/2006 | Joskin et al. |
| 2008/0211941 | A1* | 9/2008 | Deever ................ H04N 5/2258 348/262 |
| 2011/0295540 | A1* | 12/2011 | Makinen ................. G01K 1/20 702/99 |
| 2012/0229671 | A1* | 9/2012 | Niikura ................ H04N 5/2353 348/226.1 |
| 2014/0126690 | A1* | 5/2014 | Yamaguchi ............ A61B 6/484 378/36 |
| 2014/0209655 | A1* | 7/2014 | Hague ................ B65H 23/0204 226/15 |
| 2014/0267482 | A1* | 9/2014 | LeFevre ............... B41J 11/0015 347/14 |
| 2014/0306894 | A1* | 10/2014 | Lee ..................... G06F 3/03543 345/166 |
| 2015/0015635 | A1* | 1/2015 | Piatt ...................... G01B 11/14 347/16 |
| 2016/0279978 | A1* | 9/2016 | Stephens ................... B41J 3/60 |

FOREIGN PATENT DOCUMENTS

| | | |
|---|---|---|
| EP | 1457335 | 9/2004 |
| EP | 2529932 | 12/2012 |
| JP | 2010058484 | 3/2010 |
| KR | 20090087313 | 8/2009 |

OTHER PUBLICATIONS

Reliable High-speed Scanner Increases Office Efficiency, (Research Paper), Jan. 2013.

* cited by examiner

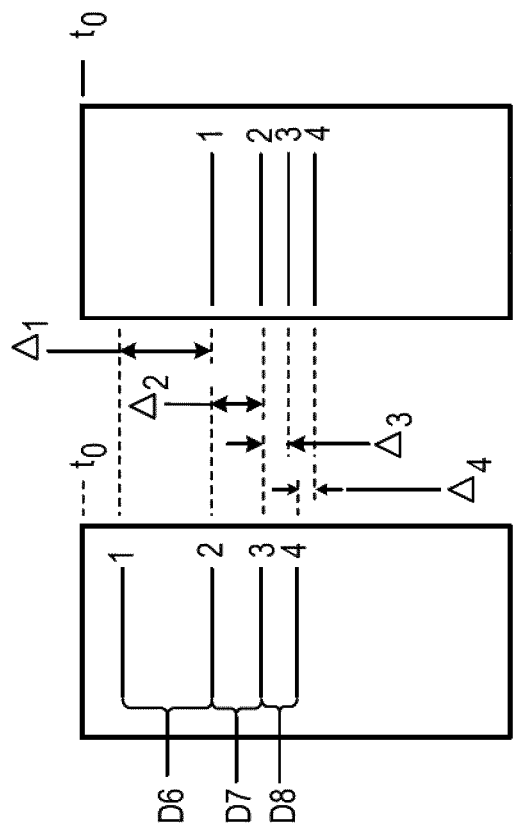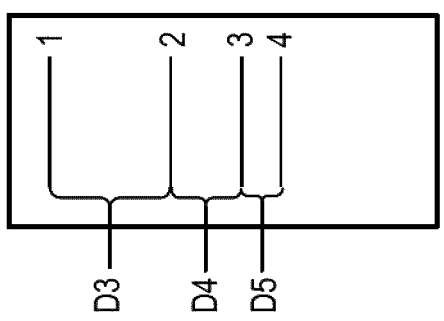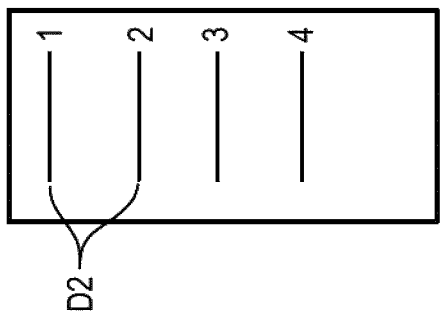

PRINTER WITH TWO SCANNERS

BACKGROUND

Many production printers use media that is fed through the paper path of the printer from a roll or web of media. The paper path includes a print zone where ink or a printing material is deposited onto the media. A take-up spindle is used to capture and roll up the media after printing. Some production printers have a scanner located in the paper path after the print zone. The scanner is used to capture an image of the printing material deposited on the media. The captured image can be used to adjust the location of printed images on the media.

BRIEF DESCRIPTION OF THE DRAWINGS

FIG. 2A is an example digital pattern containing four lines (numbered 1-4) with a constant spacing between the lines.

FIG. 2B is the image from FIG. 2A printed using an example printer.

FIG. 2C is an example image captured using the first scanner.

FIG. 2D is an example image captured using the second scanner.

DETAILED DESCRIPTION

The speed of the media traveling through the paper path in a printer is controlled by a servo system. A paper path is the path through a printer that the paper travels during the printing process. In general, the servo system keeps the average speed of the paper at a constant value. Even though the average speed of the paper may be at a constant value, in some printers the instantaneous speed of the paper may vary from instant to instant. This can make it difficult for a scanner to accurately measure the position of an object on the media relative to other objects on the media.

Scanners typically have a sensor comprising three lines of photo-sensitive elements, one for each of three primary colors (typically red, green and blue). When capturing an image of an object, the scan sensor and the object to be imaged are moved relative to each other. In a flatbed scanner, the scan sensor is moved with respect to the page placed on the scan platen. In a production printer, the media is moved past a stationary scan sensor. The scan sensor takes a series of exposures as the object travels past the sensor. Each exposure captures three lines of pixels, one line for each color. The three colors for each pixel are added together to create a line of color pixels. The full image captured by the scanner is the sum of the different lines of color pixels.

Scanners typically use a constant exposure time when capturing images of an object. The exposure time for the scanner is based on the amount of light produced by the scanner light source, the optical efficiency of the scanner, the size and gain of the sensor in the scanner and the like. When the relative motion between the scan sensor and the object being imaged is constant, each exposure of the sensor captures the same distance along the axis of relative motion. By capturing the same distance along the axis of motion, the resolution of the scan along the axis of motion is constant. The resolution perpendicular to the axis of motion is determined by the number and size of the elements in the scan sensor and the magnification of the optics of the scanner.

If the relative motion between the scan sensor and the object being imaged increases during a scan, the distance along the axis of motion captured by each exposure increases. This causes a decrease in resolution or scaling along the axis of motion. If the relative motion between the scan sensor and the object being imaged decreases during a scan, the distance along the axis of motion captured by each exposure decreases. This causes an increase in resolution or scaling along the axis of motion. If the relative motion between the scan sensor and the object being imaged is a constant value at the correct average speed, the captured image will have a constant resolution and be at 100% scaling.

Figure 1A:
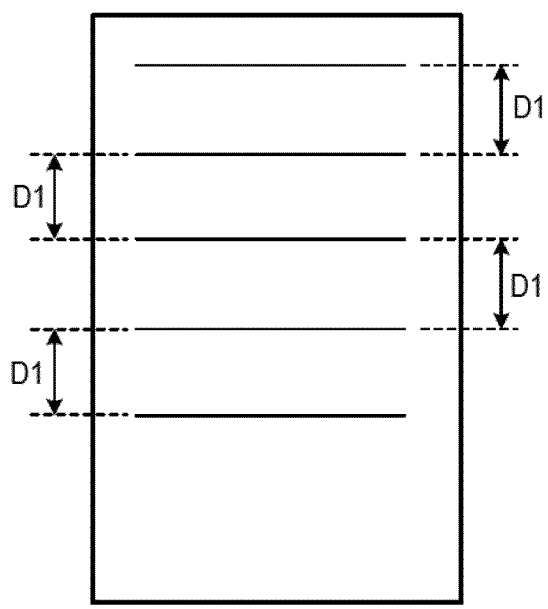
FIG. 1A is an example printed line pattern with a constant spacing between the lines.
Figure 1B:
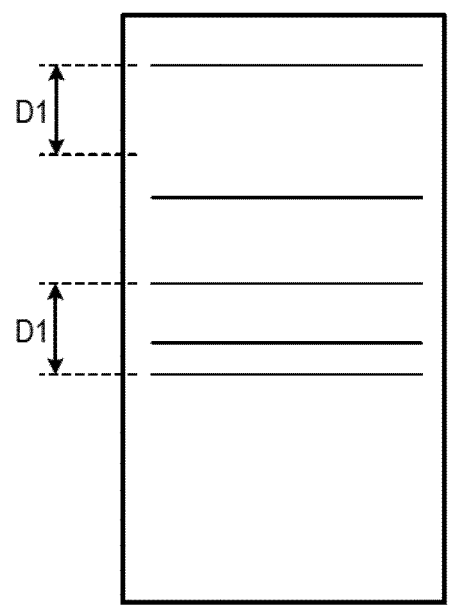
FIG. 1B is the example line pattern of FIG. 1A scanned with changing media speed.

FIG. 1A is an example printed line pattern with a constant spacing between the lines. The distance between each line is distance D1. FIG. 1B is the example line pattern of FIG. 1A scanned with changing media speed. The distance between the lines in FIG. 1B vary. The lines at the top of the page have a spacing greater than distance D1 and the lines near the bottom of the page have a spacing less than distance D1. If distance D1 on the printed page is constant and accurately known then the change in speed during the scan can be calculated by using the difference between the known spacing on the printed page and the actual spacing in the scanned image. Because the scan speed can be determined, the resolution or scaling of the scan at different point along the length of the page can also be determined. Using the different resolutions the actual location of printed objects on the page can be determined.

Unfortunately the only way the distance D1 can be accurately known is to have the lines pre-printed onto the media using a printer that does not have instantaneous speed variations. When a digital image with constant line spacing is printed on a printer that has instantaneous speed variations, the distance between the printed lines will vary dependent on the speed of the media in the print zone at the time the lines where printed. A print zone is the area in the paper path where marking material, for example ink, is deposited onto the media. When the printed image is scanned, variations in line spacing in the scanned image may be caused by the variation in media speed during printing and/or the variation in media speed during scanning. Therefore the actual speed of the media at the scanner cannot be determined using one scanner.

In one example, a printer will have two scanners located in the paper path after the print zone. The two scanners will be spaced apart by a known distance A along the axis of motion of the media through the paper path. The scanners will overlap in at least one area in a direction perpendicular to the axis of motion of the media through the paper path. Each scanner will capture an image of the same side of the media as it travels through the paper path. Each scanner will have a constant exposure time. The exposure times for the two scanners will be the same. FIG. 2A is an example digital pattern containing four lines (numbered 1-4) with a constant spacing between the lines. The distance between each line is distance D2.

FIG. 2B is the image from FIG. 2A printed using an example printer. The example printer controls the average speed of the media through the print zone to a constant value. However the speed of the media at a given instance in time may be faster or slower than the average speed. Because of the variation in speed, the distance between printed lines is not constant. The distance between line 1 and line 2 is now D3, the distance between line 2 and line 3 is D4 and the distance between line 3 and line 4 is D5. Distance D3 is larger than distance D2, indicating the media was traveling through the print zone at a faster than average speed when printing lines 1 and 2. Distance D5 is smaller than distance D2, indicating the media was traveling through the print zone at a slower than average speed when printing lines 3 and 4.

FIG. 2C is an example image captured using the first scanner. The image from the first scanner will be called image1. Image1 was captured starting at time $t_0$. In this example, the spacing between the four lines in image1 is not the same as the distance between the four lines printed on the media in FIG. 2B. This is because the media was moving at a different speed when it was printed than when it was scanned. FIG. 2D is an example image captured using the second scanner. The image from the second scanner will be called image2. Image2 was also captured starting at time $t_0$. In image2, line 1 is further down the page that in image1. That's because the second scanner is offset from the first scanner in the direction of media motion in the paper path.

The difference in the location of line 1 between the two images is Δ1 (Δ1=location of line 1 in image2−location of line 1 in image1). The location of a line in an image can be determined by examining which row of pixels the line is located at. For example when line 1 is at pixel row 20 in image 1 and line 1 is at pixel row 170 in image 2, Δ1 will equal 150 pixels (Δ1=170−20). Because the exposure time is the same for both scanners, each pixel in the images is equivalent to an exposure time. The difference in the location of line 1 between the two images (Δ1) represents the time it takes for the first line printed on the media to travel from the first scanner to the second scanner.

Because the distance between the two scanners is known (distance A) and the exposure rate is a constant, the velocity V of line 1 between the two scanners can be calculated. V=Distance/Time where the distance is distance A and the time is the number of pixels Δ1 multiplied by the exposure time. For example when Δ1 equals 150 pixels and the exposure time is 5 milliseconds, the travel time for the line to travel between the two scanners is 750 milliseconds (150*5=750). The scaling S in the image can also be calculated as $S=V_m/V_a$ where $V_m$ is the measured velocity of a line between the two scanners and $V_a$ is the average velocity of the media through the paper path. When the media is moving at the average speed between the two scanners the scaling is 1 and Δ1 will equal distance A.

This process can be used for each line as it is moved past the two scanners. For example the difference in the location of line 2 between the two images is Δ2, Δ3 for line 3 and Δ4 for line 4. This allows a real time measure of the speed/scaling for each location on the media as it passes by the second scanner. Using the calculated scaling at different points along the image, the actual location of printed objects on the page can be determined.

In the examples above a series of lines with constant spacing between the lines is used. The spacing between the lines in the digital image does not need to be a constant. The examples used a constant spacing in the digital image to show the effects of the change in speeds on the different components of the system (print zone and first and second scanner).

The examples above use a line printed on the media as a reference mark to calculate the speed of the media. In other examples, other printed objects can be used as the reference mark to calculate the speed of the media. For example the top edge of an image can be used as the reference mark or the top edge of a row of text can be used as the reference mark. Any image printed on the media that has an edge perpendicular to the axis of media travel can be used as a reference mark. In some examples ink not visible to the human eye may be used to print the reference mark, for example inferred or ultraviolet ink may be used to print the reference mark.

Figure 3:
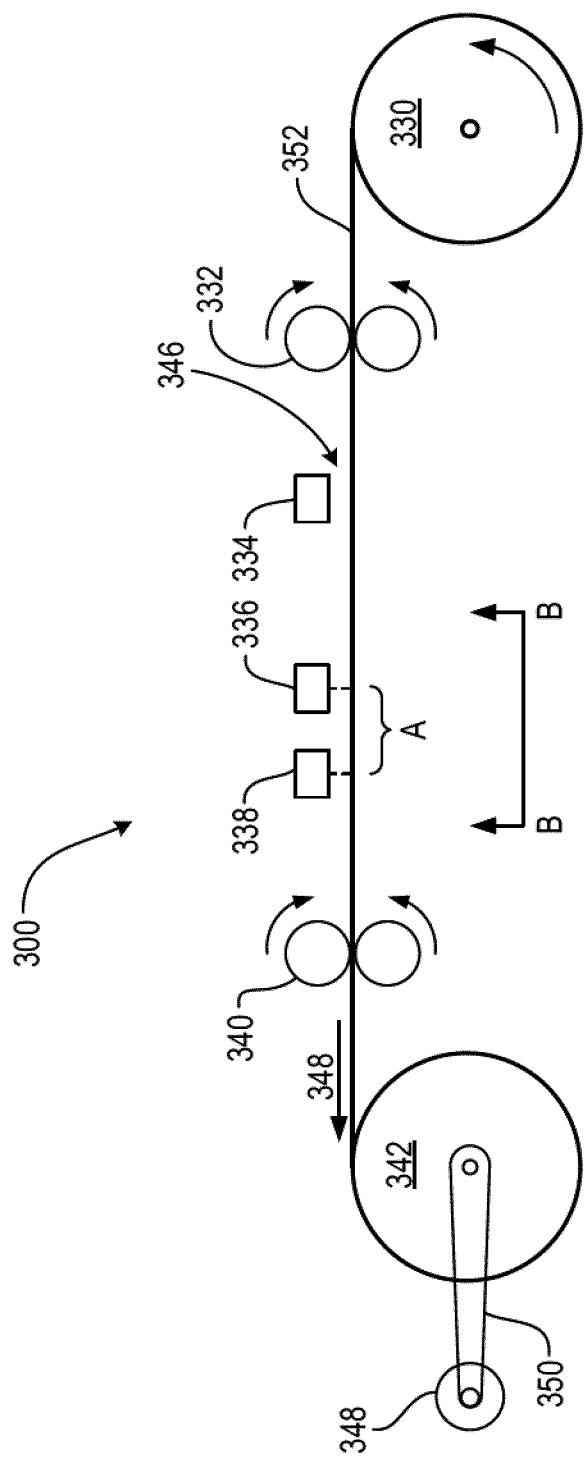
FIG. 3 is a schematic view of an example printer 300.

FIG. 3 is a schematic view of an example printer 300. Printer 300 comprises a media source 330, media 352, a pair of pinch rollers 332, a printhead 334, a first scanner 336, a second scanner 338, a pair of output rollers 340, a media take-up spindle 342 and a motor 348. A paper path runs from the media source 330 through the pair of pinch rollers 332, past the printhead 334, past the first scanner 336 and the second scanner 338, between the pair of output rollers and onto the media take-up spindle. The media take-up spindle is known as the media take-up location. A print zone 346 is underneath printhead 334. The paper path in the printer may also include a second printhead for printing on the second side of the media, one or more drying area and the like, but these features are not shown for clarity. Media 352 is shown running from the media source 330, through the paper path and onto the take-up spindle 342.

In one example, motor 348 is coupled to media take-up spindle by belt 350. Motor 348 is part of a servo system than controls the average speed of the media through the paper path. Motor 348 may be either an alternating current (AC) motor or a direct current (DC) motor. Motor 348 has a sensor that outputs the current rotational speed of motor 348. The servo system uses the current rotational speed of the motor to calculate and control the average speed of the media through the paper path. The servo system may have additional motors and sensors attached to the media source, the pair of pinch rollers and/or the pair of output rollers, but these motors and sensors are not shown for clarity.

Figure 4:
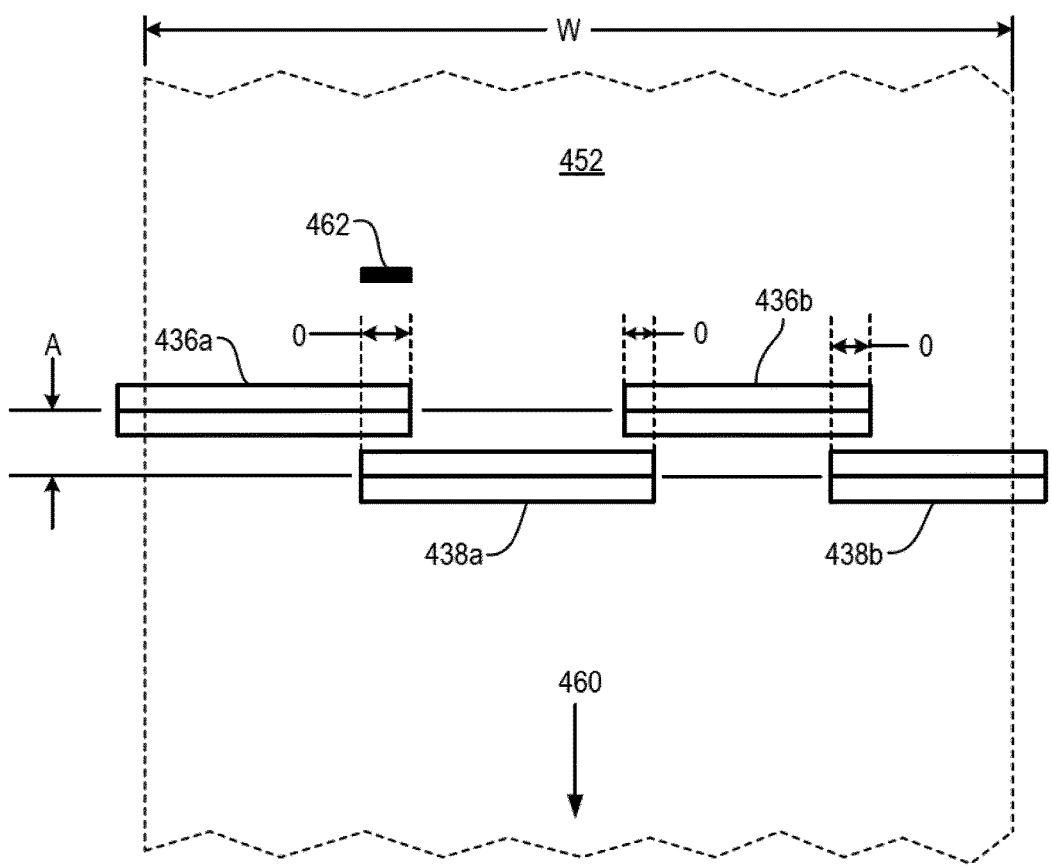
FIG. 4 is a bottom sectional view BB of printer 300 from FIG. 3.

FIG. 4 is a bottom sectional view BB of printer 300 from FIG. 3. FIG. 4 shows a bottom view of a section of media 452 looking upwards towards the scanners. The media is shown as a dotted line for clarity. Media 452 has a width W and moves along an axis of motion through the paper path as shown by arrow 460. The axis of motion is perpendicular to the width of the media. There are 4 scanners (436a, 436b, 438a and 438b) in a staggered line spaced across the width of media 452. In other examples there may only be two scanners. The images from the 4 scanners can be stitched together to form an image that has a width equal to the width of the media W.

A first pair of scanners (436a and 436b) are offset from a second pair of scanners (438a and 438b) along the axis of motion (as shown by arrow 460). The distance between the two sets of scanners along the axis of motion is distance A. In one example distance A is between 50 and 90 mm, for example 69 mm. Each scanner in the staggered line across the width of the media 452 overlaps the next scanner in the line by a distance O. In other examples, the scanners may overlap each other completely.

A reference mark 462 is shown in the overlap area of scanners 436a and 438a. As the media 452 travels through the paper path along the direction of motion (as shown by arrow 460), the reference mark 462 will pass under the first scanner 436a and then will pass under the second scanner 438a. When the two scanners (436a and 438a) have the same constant exposure time and start capturing an image at the same time, the two images captured will be similar to FIGS. 2C and 2D. Using the location of the reference mark in the two images the velocity of the reference mark as it travels between the two scanners can be determined. Using the determined velocity the resolution and scaling at that location on the media can also be determined. Using the calculated resolution or scaling at the different locations along the image, the actual location of printed objects on the page can be determined.

The actual location of printed objects on the page can be used to adjust the relative location of objects to be printed. For example a top of page reference mark may be printed periodically on the media. The image for each page is printed between two of the top of page reference marks. When the spacing between the top of page reference mark and the image of the page is incorrect, the margins of the page may be uneven when the roll of media is cut into pages. By determining the actual location of the top of page reference mark and the actual location of the image of the page, the spacing between the two can be adjusted.

Figure 5:
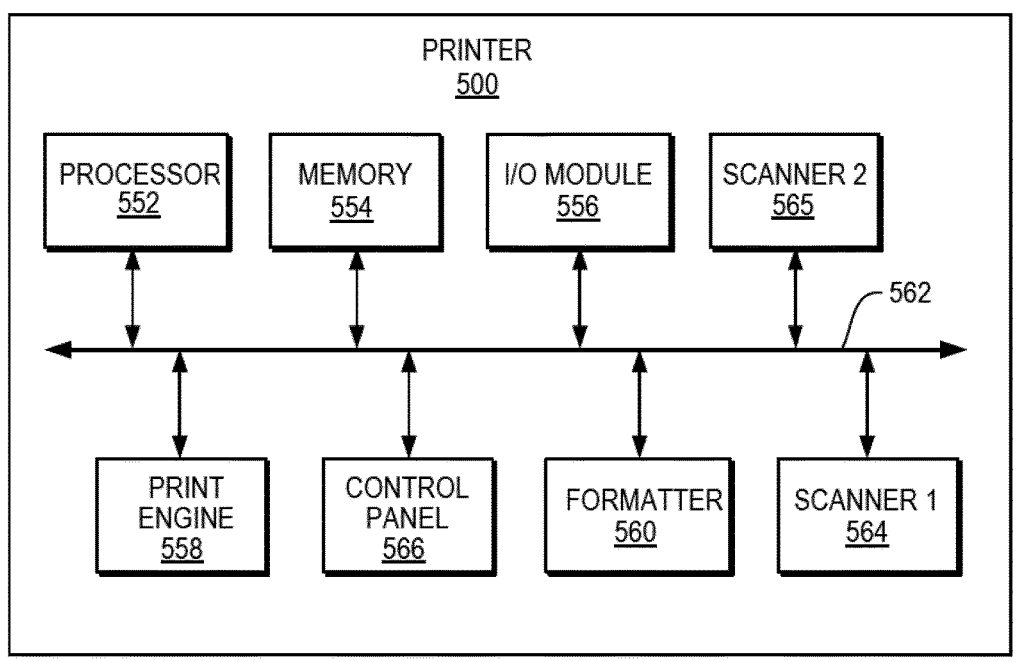
FIG. 5 is an electrical block diagram of an example printer 500.

FIG. 5 is an electrical block diagram of an example printer 500. Printer 500 comprises a processor 552, memory 554, input/output (I/O) module 556, print engine 558, formatter 560, control panel 566, a first scanner 564 and a second scanner 565 all coupled together on bus 562. In some examples printer 500 may also have a user interface module, an input device, and the like, but these items are not shown for clarity. Processor 552 may comprise a central processing unit (CPU), a micro-processor, an application specific integrated circuit (ASIC), or a combination of these devices. Memory 554 may comprise volatile memory, non-volatile memory, and a storage device. Memory 554 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

I/O module 556 is used to couple printer 500 to other devices, for example the Internet or a computer. Printer 500 has computer executable code, typically called firmware, stored in the memory 554. The firmware is stored as computer readable instructions in the non-transitory computer readable medium (i.e. the memory 554). Processor 552 generally retrieves and executes the instructions stored in the non-transitory computer-readable medium to operate printer 500 and to execute functions. In one example processor 552 executes code that measures the speed of the media passing by the first and second scanners (564 and 565).

Figure 6:
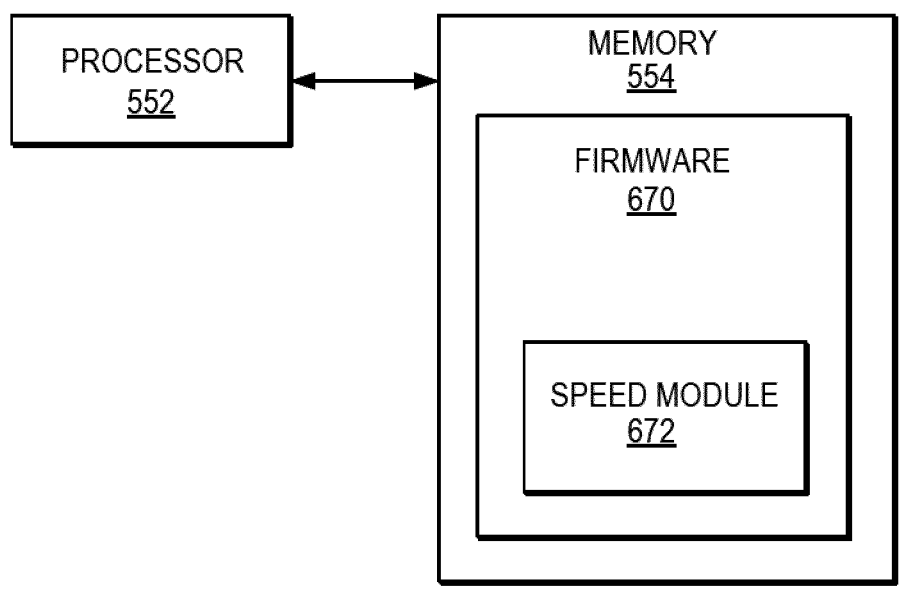
FIG. 6 is an example block diagram of the processor 552 coupled to memory 554.

FIG. 6 is an example block diagram of the processor 552 coupled to memory 554. Memory 554 contains firmware 670. Firmware 670 contains a speed module 672. The processor 552 executes the code in speed module 372 to measure the speed of the media passing by the first and second scanners (564 and 565).

Figure 7:
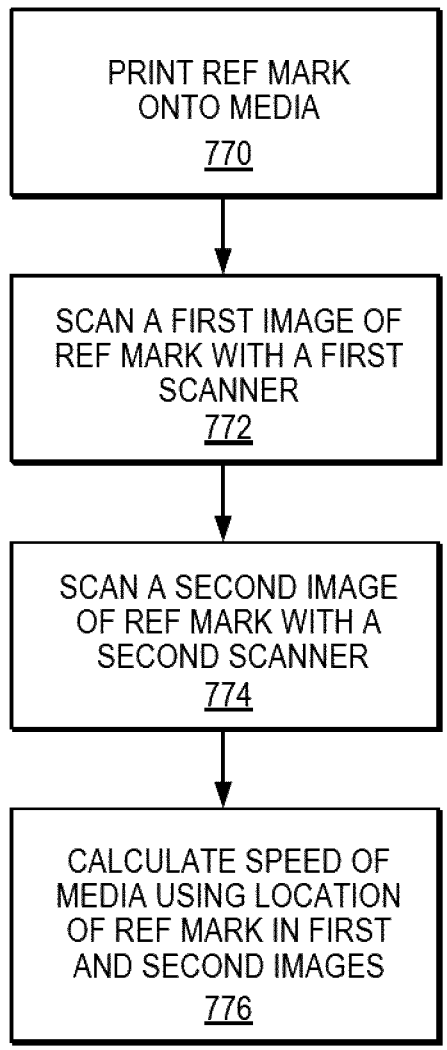
FIG. 7 is an example flow chart for a speed module.

FIG. 7 is an example flow chart for a method of operating a speed module, for example the speed module of FIG. 6. Flow starts at 770 where a reference mark is printed onto media. Flow continues at 772 where a first image of the reference mark is scanned with a first scanner. Flow continues at 774 where a second image of the reference mark is scanned with a second scanner. Flow continues at 776 where the speed of the media is calculated using the location of the reference mark in the first and second images.

What is claimed is:

1. A printer, comprising:
   a paper path, the paper path having a media feeding position and a media take-up position;
   a print zone located between the media feeding position and the media take-up position;
   a first scanner and a second scanner located in the paper path between the print zone and the media take-up position, the first scanner offset from the second scanner along a media axis of motion by a distance A, the first scanner overlapping the second scanner on the media axis of motion, the first scanner to capture a first image of a first side of media, the second scanner to capture a second image of the first side of the media, and
   wherein the first scanner and the second scanner have equal exposure times and the exposure time is a constant and the first image and the second image are captured starting at time $t_0$; and
   a controller to calculate the scaling of the images along a length of the media by comparing the overlapped area in the first image to the overlapped area in the second image.

2. The printer of claim 1, wherein the scaling S is equal to $V_m/V_a$ where $V_m$ is a measured velocity of the media between the first and second scanners and $V_a$ is an average velocity of the media in the paper path.

3. The printer of claim 1, wherein the scaling is determined by the difference in a location of at least one reference mark in the first image and a location of the at least one reference mark in the second image.

4. The printer of claim 3, wherein the at least one reference mark is selected from the group of reference marks comprising: a line printed on the media, a line of text printed on the media, an edge of an image printed on the media.

5. The printer of claim 3, wherein the at least one reference mark is printed with a marking material not visible to the human eye.

6. The printer of claim 1, wherein the scaling is used to calculate a distance between two objects printed on the media.

7. The printer of claim 1, wherein distance A is between 50 and 90 mm.

8. The printer of claim 1, wherein the first scanner and the second scanner each comprise two separate units spaced apart along a width of the paper path.

9. The printer of claim 8, wherein a portion of each separate scanner unit of each scanner overlaps along the media axis of motion with a portion of another separate scanner unit of the other scanner.

10. The printer of claim 1, the controller further to adjust a location of a subsequent printed image on the media based on the calculation of the scaling of a previous image along the length of the media.

11. A method of printing, comprising:
    printing a reference mark onto media in a print zone of a paper path;
    scanning a first image of the reference mark with a first scanner from a first location in the paper path, where the first location is between the print zone and a media take-up location;
    scanning a second image of the reference mark with a second scanner from a second location in the paper path, where the second location is between the first location and the media take-up location; and calculating the speed of the media in the paper path between the first and second scanners using the location of the reference mark in the first and second images;

wherein the first scanner and the second scanner have equal exposure times and the exposure time is a constant and the first image and the second image are captured starting at time $t_0$.

12. The method of claim 11, wherein the reference mark is selected from the group of reference marks comprising: a line, a line of text, an edge of an image.

13. The method of claim 11, wherein the reference mark is printed with a marking material not visible to the human eye.

14. The method of claim 11, wherein the media is a web of media.

15. The method of claim 11, wherein the first scanner and the second scanner each comprise two separate scanner units spaced apart along a width of the paper path, and a portion of each separate scanner unit of each scanner overlaps along the media axis of motion with a portion of another separate scanner unit of the other scanner.

16. The method of claim 15, the method further comprising stitching together data from the first and second scanners to produce the first and second images.

17. The method of claim 11, the method further comprising adjusting a location of a subsequent printed image on the media based on the calculation of the speed of the media in the paper path.

18. A non-transitory computer readable medium containing computer executable instructions, that when executed by a processor in a printer, performs the following method, comprising:

printing a reference mark onto media in a print zone of a paper path;

scanning a first image of the reference mark with a first scanner from a first location in the paper path, where the first location is between the print zone and a media take-up location;

scanning a second image of the reference mark with a second scanner from a second location in the paper path, where the second location is between the first location and the media take-up location, wherein the first scanner and the second scanner have equal exposure times and the exposure time is a constant and the first image and the second image are captured starting at time $t_0$;

calculating the speed of the media in the paper path between the first and second scanners using the location of the reference mark in the first and second images; and adjusting a location of a subsequent printed image on the media based on the calculation of the speed of the media in the paper path.

* * * * *